United States Patent [19]

Takeuchi et al.

[11] Patent Number: 5,270,407
[45] Date of Patent: Dec. 14, 1993

[54] PROCESS FOR PREPARING AN ETHYLENE-BASED COPOLYMER

[75] Inventors: Mikio Takeuchi; Yuji Obara; Masahiko Katoh; Masafumi Ohwaki, all of Tokyo, Japan

[73] Assignee: Exxon Chemical Patents Inc., Linden, N.J.

[21] Appl. No.: 955,854

[22] PCT Filed: Jun. 12, 1991

[86] PCT No.: PCT/JP91/00783
§ 371 Date: Dec. 10, 1992
§ 102(e) Date: Dec. 10, 1992

[87] PCT Pub. No.: WO91/19747
PCT Pub. Date: Dec. 26, 1991

[30] Foreign Application Priority Data

Jun. 12, 1990 [JP] Japan ............................... 2-153484

[51] Int. Cl.$^5$ ...................... C08F 4/649; C08F 210/16
[52] U.S. Cl. ...................... 526/74; 526/128; 526/160; 526/165; 526/169.2; 526/282

[58] Field of Search ...................... 526/74, 169.2, 160, 526/165, 194, 128, 282, 169

[56] References Cited

U.S. PATENT DOCUMENTS

| | | | |
|---|---|---|---|
| 3,671,505 | 6/1972 | Schrage et al. | 526/169.2 |
| 3,900,454 | 8/1975 | Sato et al. | 526/128 X |
| 4,675,368 | 6/1987 | Bienfait et al. | 526/75 |

*Primary Examiner*—Fred Teskin
*Attorney, Agent, or Firm*—John E. Schneider

[57] ABSTRACT

The present invention relates to a process for copolymerizing ethylene and α-olefin, or ethylene, α-olefin, and an unconjugated diene, in the presence of a catalyst in which at least one kind of transition metal compound, such as a V, Zr, or Hf compound, and an organic aluminum compound, are supported, and with the coexistence of a polysiloxane compound. By the process of the present invention fouling can be prevented when an ethylene-based copolymer is industrially prepared. Thus a continuous operation is made possible.

16 Claims, No Drawings

PROCESS FOR PREPARING AN ETHYLENE-BASED COPOLYMER

FIELD OF TECHNOLOGY

The present invention relates to a process for preparing an ethylene-based copolymer, and, more especially, to a process suitable for preparing an ethylene-based copolymer by a slurry polymerization process.

BACKGROUND OF THE TECHNOLOGY

For processes for industrially preparing a polyolefin from an olefin, the liquid polymerization process, the slurry polymerization process, and the gas phase polymerization process, have been known. Since in the liquid polymerization process a polymer is dissolved in a liquid phase and the polymerization is conducted in a homogeneous phase, this process has a defect in that much energy is needed to separate the polymer from a solvent and the device for the polymerization becomes complicated.

In contrast, in the slurry polymerization process and the gas phase polymerization process since the polymerization is conducted in a liquid phase and a gas phase, respectively, to obtain a solid particulate polymer, they have such advantages that the separation of the polymer is easy and the device for the polymerization can be simplified. However, although in those polymerization processes it is necessary that solid particles do not adhere to one another, in the process for preparing a rubbery polymer having adhesive properties adhesion occurs between the particles or between the particles and the surface of the wall of the reactor or the transport line, and thus the particles accumulate, and cause a phenomenon that makes preparing the polymer impossible (fouling).

Accordingly, conventionally, the slurry polymerization process and the gas-phase polymerization process have been adopted for the preparation of a polymer that has crystalline properties and has little adhesion properties, but have not been adopted for the industrial preparation of an ethylene-based copolymer such as an ethylene-α-olefin copolymer and an ethylene-α-olefin-unconjugated diene terpolymer, which is required to have rubbery properties and which is obtained by a polymerization especially using at least one kind of transition metal-based catalyst selected from the group consisting of V, Zr, and Hf, because intensive fouling occurs when a continuous operation is conducted for a long time. For the industrial preparation of the rubbery copolymers, the liquid polymerization process or a slurry polymerization process that is done by adding a large quantity of a solvent and is thus substantially similar to the liquid polymerization process, has been adopted.

To prevent the adhesion of the polymer particles, a process has been proposed in which an antistatic agent, etc., is added in the polymerization reactor when ethylene and an α-olefin are polymerized in the presence of a V, Zr, and Hf-based catalyst to obtain a rubbery copolymer (Japanese Patent Early-publication No. 56-51164, Japanese Patent Early-publication No. 59-64604, Japanese Patent Early-publication No. 61-7307, and Japanese Patent Early-publication No. 61-57608). Those processes are proved to have effects in preparing a polymer having strong crystalline properties or when a batch-wise polymerization is done in a small autoclave; however, they are insufficient in preventing fouling in the industrial preparation of a rubbery copolymer with a V, Zr, and Hf-based catalyst by a continuous operation over a long period.

Japanese Patent early-publication 60-94412 proposes that when a slurry polymerization is conducted in the presence of a Ti-based catalyst the coating film layer of a polysiloxane compound is formed in advance on the surface of the inner wall of a reactor or the part which a reacting catalyst contacts, and this prevents adhesion of the produced rubbery polymer to the surface of the wall, etc. However, a slurry polymerization using at least one kind of transition metal-based catalyst, said transition metal being selected from the group consisting of V, Zr, and Hf, cannot be industrially adopted, since in comparison with a slurry polymerization using a Ti-based catalyst, the produced polymer is a more random and rubbery copolymer, intensive fouling occurs, and the adhesion among particles cannot be prevented even if the above-mentioned countermeasure is taken. The above processes have such defects wherein forming a coating film layer of a polysiloxane on the inner wall of a reactor or on the part of the surface which a reaction medium contacts is needed, and thus the cost of the preparation becomes higher.

DISCLOSURE OF INVENTION

The object of the present invention resides in providing a process for preparing an ethylene-based copolymer, which process can resolve the problems in said conventional technology and can effectively prevent the fouling upon industrially preparing a rubbery ethylene-based copolymer by a heterogenous polymerization process, particularly by a slurry polymerization method in the presence of at least one kind of transition metal-based catalyst, said transition metal being selected from the group consisting of V, Zr, and Hf compounds, to make a continuous operation possible.

In view of this problem the present inventors have made extensive research. As a result, they found that much less fouling occurs by a polymerization process that is done in the presence of at least one kind of transition metal-based supported catalyst, said transition metal being selected from the group consisting of V, Zr, and Hf compounds and with the coexistence of a silicone in the polymerization system to make a continuous operation possible. Thus they accomplished the present invention.

The present invention resides in providing a process for preparing an ethylene-based copolymer, which process is characterized by copolymerizing ethylene and an α-olefin, or ethylene, α-olefin, and an unconjugated diene, in a polymerization medium in which the produced copolymer is not substantially dissolved, in the presence of a catalyst in which at least one kind of transition metal compound and an organic aluminum compound are supported on a carrier, said transition metal compound being selected from the group consisting of V, Zr, and Hf compounds, and with the coexistence of a polysiloxane compound.

BEST EMBODIMENT TO CONDUCT INVENTION

For the α-olefins used in the present invention, propylene, 1-butene, 1-hexene, 4-methylpentene-1, etc., are exemplified.

For the unconjugated dienes used in the present invention, 1,4-hexadiene, dicyclopentadiene, methylcyclopentadiene, vinylnorbornene, 5-ethylidene-2-norbornene, isopropenylnorbornene, etc., are exemplified.

The ethylene-based copolymer in the present invention is prepared by a slurry polymerization method in a polymerization medium that is a hydrocarbon having 3 to 5 carbon atoms, in which the produced copolymer is not substantially dissolved, in the presence of a supported catalyst and with the coexistence of a polysiloxane compound.

For the hydrocarbons having 3 to 5 carbon atoms, propylene, propane, n-butane, isobutane, 1-butene, 2-butene, isobutylene, n-pentane, isopentane, cyclopentane, pentene, etc., are exemplified. These may be used alone or mixed. The polymerization medium may be accompanied by a solvent such as n-hexene and toluene as long as it contains the exemplified hydrocarbon or a mixture thereof as the main ingredient.

The above-mentioned supported catalyst is used as a solid catalyst that is obtained by supporting at least one kind of transition compound selected from the group consisting of V, Zr, and Hf compounds, and an organic aluminum compound on a particulate carrier. Also, the supported catalyst may be prepolymerized under conditions that cause the formation of a prepolymer, in which formation the solid catalyst particle participates, to result in a prepolymer covered with a polymer.

For the transition metal compounds, at least one kind of compound selected from the group consisting of V, Zr, and Hf compounds, for example, Zr compounds, represented by the general formula:

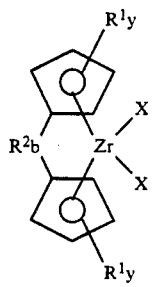

wherein each $R^1$, which is independently selected, is a $C_1$ to $C_{20}$ linear, branched, or cyclic alkyl group, or a $C_2$ to $C_4$ cyclic alkylene group that forms a fused ring, $R^2$ is a $C_1$ to $C_6$ linear, branched, or cyclic alkylene group, an alkyl-substituted $Si_1$ to $Si_2$ silanylene group, or an alkyl-substituted silaalkylene group, and wherein each X is independently an alkyl, an aryl, a halide, a hydride, or an oxygen bridge of a zirconocene dimer, y is 2, 3, or 4, b is 0 or 1, wherein, for example, dimethylsilicon-bis(tetrahydroindenyl) zirconium chloride, tetrahydroindenylzirconium chloride, indenylzirconium chloride, and oxytrichlorinated vanadium etc., are used. Among those compounds, Zr compounds are preferred.

For the organic aluminum compounds, compounds represented by the general formula:

$$AlR^1R^2R^3$$

wherein $R^1$, $R^2$, and $R^3$, which are the same or different, an alkyl or alcoxyl group having 1 to 14 carbon atoms, a halogen atom, or a hydrogen atom, provided that at least one, more preferably two of them, are alkyl groups, and compounds represented by the general formula:

$$R^4R^5Al-O-AlR^6R^7$$

wherein $R^4$, $R^5$, $R^6$ and $R^7$, which are the same or different, an alkyl or alcoxyl group having 1 to 14 carbon atoms, etc., are used.

Illustrative examples of these include triethyl aluminum, tripropyl aluminum, triisobutyl aluminum, trihexyl aluminum, trioctyl aluminum, dimethyl aluminum chloride, diethyl aluminum chloride, diethyl aluminum hydride, diethyl aluminum ethoxide, ethyl aluminum sesquichloride, ethyl aluminum dichloride, bis(diethyl aluminum)oxide, etc..

Any alumoxane, such as a compound represented by the general formula:

$$(R^8-Al-O)_n \text{(cyclic compound)}$$

wherein $R^8$ is an alkyl group having 1 to 5 carbon atoms, such as methyl, ethyl, propyl, butyl, and pentyl, etc., and n is an integer of 1 to 40, or a compound represented by the general formula:

$$R^8(R^8-Al-O)_nAl(R^8)_2$$

wherein $R^8$ and n are as defined above, can be used.

Those organic aluminum compounds may be used either alone or combined. An activation-improver or modifying agent that is suitable for each transition metal may be also added.

For the particulate supports, granular or particulate inorganic or organic compounds having a particle diameter of 10 to 300 μm are used.

For the inorganic supports, porous oxides are preferable, and $SiO_2$, $Al_2O_3$, $MgO$, $ZrO_2$, $TiO_2$, $B_2O_3$, $CaO$, $ZnO$, $BaO$, $ThO_2$, $SiO_2$-$MgO$, $SiO_2$-$Al_2O_3$, $SiO_2$-$TiO_2$, $SiO_2$-$V_2O_5$, $SiO_2$-$Cr_2O_3$, $SiO_2$-$TiO_2$-$MgO$, etc. are exemplified. They may be in a combined use. Among these, a support containing as the main ingredient at least one kind of ingredient selected from the group consisting of $SiO_2$ and $Al_2O_3$ is preferable.

For the organic supports, granular or particulate solids of inorganic compounds having a particle diameter of 10 to 300 μm are exemplified. For the organic compounds, (co)polymers having as the main ingredient α-olefin such as ethylene, propylene, and 1-butene, and (co)polymers having as the main ingredient vinyl cyclohexane or styrene, are used.

The polysiloxane compound used in the present invention coexists in the polymerization reaction system to prevent the adhesion of an ethylene-based copolymer.

For the polysiloxane compounds, polyorganosiloxane compounds having the average composition ratio:

$$RaSiO_{\frac{4-a}{2}}$$

wherein R is a substituted or unsubstituted monovalent organic group, for example, a methyl group, an ethyl group, a propyl group, a vinyl group, a phenyl group, or a halogen-substituted hydrocarbon group thereof, the "a" is a number of over 0 and less than 4, preferably 1.800 to 2.500, specifically and preferably 1.900 to 2.002, are used. Although the polysiloxane compounds are mainly linear compounds, in some of the compounds a branched structure or a three-dimensional structure may be formed. The polysiloxane compounds may be homopolymers, copolymers, or mixtures thereof. The polymerization degree of the polyorganosiloxane having said average composition ratio is preferably 3 to 10,000, more preferably 2,000 to 10,000. This more preferable polymerization degree can lower the bleeding when a product is processed.

The polyorganosiloxanes having said average composition ratio, the terminals of the molecular chain of which polyorganosiloxanes are hindered with a trimethylsilyl group, dimethylvinylsilyl group, triphenylsilyl group, etc., are preferable. The polyorganosiloxanes, the terminals of which are hindered with a trimethylsilyl group, are specifically preferred since their disadvantageous effects on activity in polymerization are less.

Although the molecular weights of the polysiloxane compounds are not specifically limited, those compounds having molecular weights with which polysiloxane compounds are soluble in a polymerization medium are preferable from the viewpoint of which procedures, such as the separation of a solid or wash of slurry, are easy, from the viewpoint of the contamination of the polysiloxane into a product polymer being prevented, and from the viewpoint of the separated polysiloxane being recycled.

The methods of the addition of a polysiloxane to a reactor are not specifically limited as long as the polysiloxane can be uniformly dispersed in a polymerization liquid. If the polysiloxane is in a liquid form such as a silicone oil, it may be directly introduced, or may be mixed with any polymerization feed liquid and supplied. With a polysiloxane having a poor fluidity, such as a raw rubber, it may be added by dissolving it in a solvent, or dissolved in advance in a polymerization feed liquid, and supplied in the same way as for silicone oil.

The polysiloxane compounds are preferably used in a range of 0.1 to 5,000 ppm in a polymerization medium, more preferably 1 to 500 ppm. Based on the amount of the produced copolymer, a range of 1 to 50,000 ppm of the polysiloxane compound is preferable, but a range of 10 to 5,000 ppm is more preferable. Although the more polysiloxane added, the more the effect of preventing adhesion, if the added amount is too much, polysiloxane is included in the copolymer. This deteriorates the quality of the copolymer, in addition to the fact that it affects the polymerization reaction. Thus the maximum added amount is determined depending on the acceptable residual amount of the polysiloxane, for the use of the product, or depending on the removing ability when any removing facilities are provided. For cleaning facilities, those generally furnished for removing residual mediums, by-products, unreacted monomers, etc., in a copolymer, can be used. The minimum added amount is determined depending on the adhesivity of the polymer that is prepared.

EXAMPLES

The present invention will be explained in more detail by the Examples below. The invention is not limited by them.

The ethylene contents, iodine values, and the evaluation of the roll workability of raw rubbers, are all determined by the following method:

(1) Ethylene Content

The composition ratio of an ethylene-α-olefin copolymer is obtained by using NMR, a calibration curve is made by infrared spectroscopic analysis, and the composition of the copolymer is determined based on the calibration curve.

(2) Iodine Value

The double bond content in the copolymer is determined by infrared spectroscopic analysis, and the iodine value is thus determined.

(3) Test for a Roll Workability for a Raw Rubber 250 g of a copolymer (a raw rubber) is wrapped around a 6-inch roll having a nip width of 0.4 mm at a roll temperature of 100° C.±5° C. The roll workability for the raw rubber is then evaluated to show "excellent" or "poor" on the basis of the time needed to tightly wrap it, and whether the wrapping is tight or not.

The catalysts were prepared using the following methods:

(1) The Preparation of SZ Catalyst 100 g of Davison 948 silica gel (produced by Fuji-Davison Chemical Ltd.), from which water had been removed by heating at 800° C. for 4 hours, was introduced into a 5 l separable flask that had been sufficiently dried, and it was substituted for by nitrogen gas. Then 2,000 ml of a methylalumoxane solution (made by Ethyl Corporation), prepared as a 1 mol/l toluene solution of aluminum, was added to the flask. The thus-obtained contents were subjected to stirring at 80° C. at 600 rpm for 1 hour. Then toluene was evaporated by a diminishing pressure to obtain dried powders.

80 g of the thus-obtained powders were introduced into a 3 l separable flask, and 1,400 ml of dried pentane was added. Then 1.6 g of dimethylsilicon-bis(tetrahydroindenyl)zirconium chloride that was dissolved in 120 ml of dried toluene was added to the thus-obtained solution while it was stirred at 600 rpm, and was later stirred at room temperatures for 15 minutes. While the flask was cooled in a water bath, a prepolymerization was conducted by adding ethylene gas to the flask at the rate of 240 millimole/min for 30 minutes. The thus-obtained slurry was filtrated, and the thus-obtained solid was washed with 1,200 ml of dried pentane three times and then dried to obtain 246.8 g of prepolymerized solid catalyst (this catalyst is referred to below as a "SZ catalyst").

(2) Preparation of a SV Catalyst 683 g of Davison 952 silica gel (Produced by Fuji-Davison Chemical Ltd.) from which water had been removed by heating at 400° C. for 10 hours, was introduced into a 5 l separable flask that had been sufficiently dried, and it was substituted for by nitrogen gas. Then hexane was added to the flask to result in 4 l of slurry. Then 212.7 ml of 3 mole/l of a diethylaluminum monochloride solution prepared with a hexane solvent was added dropwise over 35 minutes while it was stirred at 600 rpm, and after that, stirring at 150 rpm was continued for 2 hours. Then the revolutions were again increased to 600 rpm, and 127.6 ml of 2 mole/l of vanadium oxytrichloride, prepared with a hexane solvent, was added dropwise over 20 minutes, and the stirring was continued for a further 30 minutes. Then the hexane in the slurry was evaporated in a nitrogen air stream to obtain dried free-flowing powders (this catalyst is called below a "SV catalyst") in which 1 milimole of diethylaluminum monochloride and 0.4 milimole of vanadium oxytrichloride were contained in 1 g of silica gel.

The silicones that were used in the Examples are silicones A, B, C, D, B1, B2, B3, B4, and B5, shown as follows, and are represented by the general formula:

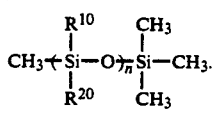

Each of the silicones was dissolved in n-hexane to prepare a 3% by weight solution and deaerated and dehydrated to a water content of 5 ppm or less by bubbling with a dried nitrogen, and used:

A: a copolymer of dimethylsiloxane/diphenylsiloxane having a molar ratio of 90/10 and a polymerization degree of about 5,000

B: a homopolymer of dimethylsiloxane, said polymer having a polymerization degree of about 5,000

C: a copolymer of dimethylsiloxane/methylvinylsiloxane having a molar ratio of 99/1 and a polymerization degree of about 5,000

D: a copolymer of dimethylsiloxane/methyl-1,1-1,-trifluoropropylsiloxane having a molar ratio of 90/10 and a polymerization degree of about 5,000

B1: a homopolymer of dimethylsiloxane, said polymer having a viscosity of 500,000 cSt B2: a homopolymer of dimethylsiloxane, said polymer having a viscosity of 100,000 cSt B3: a homopolymer of dimethylsiloxane, said polymer having a viscosity of 10,000 cSt B4: a homopolymer of dimethylsiloxane, said polymer having a viscosity of 1,000 cSt B5: a homopolymer of dimethylsiloxane, said polymer having a viscosity of 100 cSt

EXAMPLE 1

An aggitating blade, a thermometer, a pressure gauge, supply pipes for additives and catalysts, an ethylene-blowing tube, and a hydrogen-blowing tube, were attached to a 3 l autoclave with a jacket. The content of the autoclave was sufficiently substituted for by nitrogen, so as to be dried. 0.1 g of triethylaluminum (TEAL) as an organic aluminum was diluted with n-hexane, and the thus-obtained diluted product was injected into a catalyst-supplying pipe of the autoclave, 0.04 g of silicone B was diluted with n-hexane, and the thus-diluted product was injected into it. Then 450 g of dried propylene liquid were also injected into it. Thus all the injected substance was charged in the autoclave. 70 cc of a small vessel was filled with hydrogen to reduce the pressure difference in the vessel by 7 kg/cm². Then 300 NL of ethylene was injected through a flowmeter. The temperature of the autoclave was kept at 35° C. by an external jacket.

Then 0.3 g of the SZ catalyst was added to the autoclave and a copolymerization was begun. The temperature during the polymerization was kept fixed by controlling the cooling level in the jacket. Thirty minutes after the polymerization was begun a little methanol was added to the autoclave to end the polymerization.

Then the pressure of the autoclave was gradually lowered to remove the ethylene, the propylene and the hydrogen, and the autoclave was opened. The deposit on the reactor wall and the shape of the thus-obtained polymer were observed.

No bulky deposit on the wall surface or the agitating element was observed. The obtained polymer was in a spherical particulate state. The properties of the obtained copolymer are shown in Table 1.

EXAMPLE 2

A copolymer was prepared as in Example 1 except that the triethylaluminum and silicone were separately supplied without premixing them. The shape of the thus-obtained polymer was observed as in Example 1 and it was found that no deposit of the polymer on the wall surface existed, nor did the agitating element exist, and it was found that the polymer was in a spherical particulate state. The properties of the obtained copolymer are shown in Table 1.

EXAMPLES 3–11

Copolymers were obtained as in Example 1 except that the charged weight of each feedstock was as shown in Table 1. The shape and the properties of the polymer were observed in the same way as in Example 1. The result is shown in Table 1.

COMPARATIVE EXAMPLES 1–4

Copolymers were obtained as in Example 1 except that no silicone was used (Comparative Examples 1 and 2), that dioctylaluminum sulfosuccinate and STADIS 450 were used instead of silicone (Comparative Examples 3 and 4), and that the charged amounts shown in Table 1 were used. In the same way as in Example 1, the shapes and the properties of the copolymers were observed. The results are shown in Table 1. It shows that every obtained copolymer was in a bulky state, and that every copolymer was deposited on the surface of the inner wall and the agitating element. STADIS 450 is a product of Du Pont. It consists of

| | |
|---|---|
| toluene | 66% by weight. |
| a copolymer of 1-decene and sulfur dioxide in a ratio of 1:1, said copolymer having an intrinsic viscosity of 0.05 as determined in a 0.5% by weight solution in toluene at 30° C. | 13.3% by weight, |
| a reaction product of N-tallow-1,3-diaminopropane and epichlorhydrin in a molar ratio of 1:1.5 | 13.3% by weight, and |
| dodecylbenzene sulphonate | 7.4% by weight. |

EXAMPLE 12

A copolymer was obtained as in Example 1 except that 5-ethylidene-2-norbornene (ENB) was used and the charged amounts shown in Table 1 were used. ENB was in advance purified and dehydrized by a simple distillation to be used and added after 300 NL of ethylene was injected. Whether a deposit on the reactor wall for each copolymer existed, and what the shape was for each copolymer, were observed in a way similar to that in Example 1. No deposit on the wall surface nor on the agitating element was observed. The obtained polymer was in the particulate state. The properties of the thus-obtained copolymers are shown in Table 1.

COMPARATIVE EXAMPLE 5

A copolymer was obtained as in Example 12, except that silicone was not used. In the same way, the shape and properties were examined. The results are shown in Table 1. The obtained copolymer was deposited on the surface of the inner wall and the agitating element.

EXAMPLES 13 and 14

The copolymers were obtained as in Example 1, except that the polymerization temperature was 40° C., and that the added amounts of hydrogen and ethylene shown in Table 1 were used. In the same way, the shapes and the properties of the thus-obtained copolymers are shown in Table 1.

EXAMPLE 15

800 g of a dried propylene were charged into the 3 l autoclave used in Example 1, ethylene gas was charged up to 18.4 kg/cm² G while the temperature was kept at 30° C., and then hydrogen gas was charged up to 21.4 kg/cm² G.

Later, 2 millimole of diluted diethylaluminum monochloride that was diluted in normal-hexane, and 0.04 g of silicone B, were fed from the supplying pipe of the catalyst to the autoclave. 0.08 millimole, as a vanadium atom, of the SV catalyst, were also fed to the supplying pipe to begin the polymerization reaction. At 1 minute after the beginning of the polymerization reaction 0.08 millimole of diluted butyl perchlorocrotonate in normal-hexane was charged to the autoclave. The polymerization temperature was kept at 30° C. by regulating the cooling level of the jacket. At 40 minutes after the beginning of the polymerization a small amount of methanol was added to end the polymerization reaction.

The amount of the thus-obtained polymer was 75 g, which polymer contained 65% by weight of ethylene, and had a Mooney viscosity of $ML_{1+4}$ (100° C.) 90. No deposit on the wall surface or the agitating element was observed. The copolymer was in particulate state.

COMPARATIVE EXAMPLE 6

A copolymer was obtained as in Example 15 except that silicone was not used. The amount of the obtained polymer was 52 g, which polymer contained 63% by weight of ethylene, and had a Mooney viscosity of $ML_{1+4}$(100° C.) 93. 36 g of the polymer were deposited on the wall surface and the agitating element in a bulky state.

EXAMPLES 16–21

A continuous polymerization of ethylene and propylene was conducted using a 100 l-volumetric reactor provided with a jacket, in the presence of a SV catalyst, and the charged amounts shown in Table 2 were used.

Raw materials were supplied in a way such that 35 l/hour of propylene were mixed with a designated amount (such amount that the molar ratio of ethylene/propylene in the gas phase part in the reactor was 2.5 to 2.6) of ethylene. The thus-obtained mixture was cooled to a temperature of from −10° C. to −5° C., and the thus-cooled mixture was mixed with hydrogen, TEAL, and silicone in a piping to be supplied. The SZ catalyst was directly injected into the reactor in a slurry form in which it was suspended in a normal hexane solution of EPDM. The polymerization temperature was kept at 35° C. by controlling the temperature of the cooling medium in the jacket. After the continuous polymerization was continued for 2 to 4 days the feed of the catalyst was discontinued, water was injected to end the polymerization, and all the slurry inside was swept away. The reactor was opened and the state of deposits of the copolymers and the properties of the copolymers were observed. The results are shown in Table 2. In every Example an extremely stable operation was able to be continued, and the deposit ratio was as little as 6% or less. The deposit ratio was determined by the following equation:

$$\frac{\text{amount of polymer deposition on the reactor wall}}{\text{total amount of polymer}} \times 100 = \text{deposit ratio}$$

EXAMPLE 22

A copolymer was obtained in the same way as in Example 16 except that silicone A was premixed with the SZ catalyst to be added. The deposit ratio and the properties of the copolymer were observed. The results are shown in Table 2.

COMPARATIVE EXAMPLES 7 and 8

Although polymerization was conducted as in Example 16, except that silicone was not added (Comparative examples 7 and 8), the agitating element vibrated and the power rose a while after the beginning of each operation. In 20 to 30 hours after the beginning, the operation had to be stopped because no operation was possible. The deposit ratio of the obtained polymer was 60% or more, and the industrial preparation of the polymer was substantially impossible. The properties of the copolymers are shown in Table 2.

COMPARATIVE EXAMPLES 9–11

Although polymerization was conducted as in Example 6, except that instead of silicone, dioctyl sodium sulfosuccinate, n-hexane, and STADIS 450, were supplied in the respective amounts of 1 g/hour, 600 g/hour, and 1 g/hour, vibration of the agitating element and a rise in power occurred a while after the beginning of each operation. Twenty to forty hours after its beginning, the operation had to be stopped, since no operation was possible. The deposit ratio of the obtained polymer was 20% or more. The industrial preparation of the polymer was substantially impossible. The properties of the copolymers are shown in Table 2.

EXAMPLE 23

A copolymer was obtained by a continuous polymerization as in Example 16 except that ENB was used and the charged amounts shown in Table 2 were used. Raw materials were fed in a way such that 35 l/hour of propylene were mixed with a prescribed amount of ethylene, the thus-obtained mixture was cooled to a temperature from −10° C. to −5° C., and the thus-cooled mixture was then mixed with hydrogen and ENB, in that order, TEAL and silicone B were then mixed in a pipe with the thus-obtained mixture, and the thus-obtained mixture was supplied.

After the continuous polymerization was continued for two days, the supply of the catalyst was stopped, all the slurry inside was swept away, and the reactor was opened. The deposit state and the deposit ratio were observed as in Example 16. The results are shown in Table 2. It was found that an extremely stable operation was able to be continued and that the deposit ratio was as little as 2%. The raw rubber roll workability of the copolymer obtained in this Example was examined, and the judgment was "excellent."

COMPARATIVE EXAMPLE 12

Although a continuous operation was conducted as in Example 23, except that no silicone was added, blocking trouble occurred because of a violent deposit. This occurred shortly after the operation began. The raw rubber roll workability of the copolymer obtained in this Comparative example was examined, and the judgment given was "excellent."

EXAMPLE 24

30 l/hour of propylene, a prescribed amount of ethylene, 24.4 millimole/hour of DEAC (diethyl aluminum chloride), 1.0 millimole/hour of the SV catalyst, 3.0 millimole/hour of BPCC (its structural formula will be shown below), and 0.5 g/hour of silicone B, were continuously added to a 45 l-volumetric reactor provided with a jacket, to conduct a continuous polymerization of ethylene and propylene.

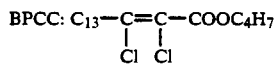

BPCC: $C_{13}-\underset{Cl}{C}=\underset{Cl}{C}-COOC_4H_7$

The polymerization temperature was kept at 30° C. by controlling both the flow of the cooling medium and the level of the self-flash cooling. The monomer composition was adjusted by controlling the feed of the ethylene such that the ethylene/propylene ratio was kept constant. The molecular weight of the copolymer was adjusted by controlling the feed of the hydrogen such that the hydrogen concentration in the gas phase part in the reactor was kept constant.

The propylene content of the obtained copolymer was 27-29% by weight and the Mooney viscosity was $ML_{1+4}$ (100° C.) 30-40.

After the continuous polymerization was continued for three days the supply of the catalyst was stopped, water was injected to end the polymerization, all the slurry inside was swept away, and the reactor was opened. The deposit state and the deposit ratio of the obtained copolymer were examined. It was found that an extremely stable operation was continued and that the deposit ratio was as little as 5%.

COMPARATIVE EXAMPLE 13

A polymer was obtained as in Example 24, except that silicone was not added. The propylene content of the obtained copolymer was 25-28% by weight and the Mooney viscosity was $ML_{1+4}$ (100° C.) 30-50.

A while after the operation was begun, the agitating element vibrated and the power rose. Thus 30 hours after the operation began the operation had to be stopped, since no further operation was possible. The deposit ratio of the obtained copolymer was 50. The industrial preparation of the polymer was substantially impossible.

COMPARATIVE EXAMPLE 14

A continuous operation was conducted in the same way as in Example 24 except that dioctyl sodium sulfosuccinate instead of silicone was added at 1.0 g/hour. The propylene content of the obtained copolymer was 24-26% by weight and the Mooney viscosity averaged about $ML_{1+4}$ (100° C.) 20.

Two days after the operation began the agitating element vibrated and the power rose. Thus the operation had to be stopped since no further operation was possible. The deposit ratio of the obtained copolymer was 15%.

TABLE 1

| | Amount of charge | | | | | | | |
|---|---|---|---|---|---|---|---|---|
| | Silicone (g) | | $C_2^{-1}$ | $C_3^{-1}$ | $H_2$ | ENB | TEAL | Catalyst |
| | Type | Amount added | NL | g | kg/cm² | ml | g | g |
| Example 1 | B | 0.04 | 300 | 450 | 7 | 0 | 0.1 | 0.3 |
| Example 2 | B | 0.04 | 300 | 450 | 7 | 0 | 0.1 | 0.3 |
| Example 3 | B | 0.08 | 300 | 450 | 7 | 0 | 0.1 | 0.3 |
| Example 4 | C | 0.04 | 300 | 450 | 6 | 0 | 0.1 | 0.3 |
| Example 5 | A | 0.04 | 300 | 450 | 6 | 0 | 0.1 | 0.3 |
| Example 6 | D | 0.04 | 300 | 450 | 6 | 0 | 0.08 | 0.3 |
| Example 7 | B1 | 0.04 | 300 | 450 | 6 | 0 | 0.08 | 0.3 |
| Example 8 | B2 | 0.04 | 300 | 450 | 6 | 0 | 0.08 | 0.3 |
| Example 9 | B3 | 0.04 | 300 | 450 | 6 | 0 | 0.08 | 0.3 |
| Example 10 | B4 | 0.04 | 300 | 450 | 6 | 0 | 0.08 | 0.3 |
| Example 11 | B5 | 0.04 | 300 | 450 | 6 | 0 | 0.1 | 0.3 |
| Example 12 | B | 0.04 | 300 | 450 | 5 | 15 | 0.08 | 0.3 |
| Example 13 | B | 0.04 | 40 | 450 | 0.5 | 0 | 0.1 | 0.3 |
| Example 14 | B | 0.04 | 125 | 450 | 5 | 0 | 0.1 | 0.15 |
| Comparative example 1 | | Not added | 300 | 450 | 6 | 0 | 0.1 | 0.3 |
| Comparative example 2 | | Not added | 300 | 450 | 6 | 0 | 0.08 | 0.3 |
| Comparative example 3 | *1 | | 300 | 450 | 5 | 0 | 0.08 | 0.3 |
| Comparative example 4 | *2 | | 300 | 450 | 6 | 0 | 0.08 | 0.3 |
| Comparative example 5 | | Not added | 300 | 450 | 5 | 15 | 0.08 | 0.3 |

| | Result of polymerization | | | | |
|---|---|---|---|---|---|
| | Yield g | $C_3$ Content % by weight | Viscosity $ML_{1+4}$ 100° C. | Iodine value | Deposits |
| Example 1 | 61.7 | | | 0 | No deposit, Particulate |
| Example 2 | 60 | | 51.5 | 0 | No deposit, Particulate |
| Example 3 | 40.6 | | | 0 | No deposit, Particulate |
| Example 4 | 57.5 | 32.4 | 61.5 | 0 | No deposit, Particulate |
| Example 5 | 60 | 27.6 | 84.5 | 0 | No deposit, Particulate |

TABLE 1-continued

| | | | | | |
|---|---|---|---|---|---|
| Example 6 | 23 | 25.7 | 21 | 0 | No deposit, Particulate |
| Example 7 | 87.2 | 29 | 72.5 | 0 | No deposit, Particulate |
| Example 8 | 64 | | 55.8 | 0 | No deposit, Particulate |
| Example 9 | 45.5 | | 60.6 | 0 | No deposit, Particulate |
| Example 10 | 31 | | 31 | 0 | No deposit, Particulate |
| Example 11 | 50.3 | | | 0 | No deposit, Particulate |
| Example 12 | 40 | 27 | 51.5 | 15 | No deposit, Particulate |
| Example 13 | 50 | 68.5 | 70 | 0 | No deposit, Particulate |
| Example 14 | 75 | 43 | 80 | 0 | No deposit, Particulate |
| Comparative example 1 | 74 | 23.9 | 63.5 | 0 | Deposit in bulk |
| Comparative example 2 | 52 | | | 0 | Deposit in bulk |
| Comparative example 3 | 50 | 26.9 | 50.1 | 0 | Deposit in bulk |
| Comparative example 4 | 52 | | | 0 | Deposit in bulk |
| Comparative example 5 | 50 | 26.9 | 50.1 | 15 | Deposit in bulk |

*1 0.04 g of dioctyl aluminum sulfosuccinate was added.
*2 0.04 g of STADIS 450 was added.

TABLE 2

| | Amount of charge | | | | | Result of polymerization | | |
|---|---|---|---|---|---|---|---|---|
| | Silicone (g) | | ENB | TEAL | Catalyst | Yield | C$_3$ Content | Viscosity |
| | Type | Amount added | g/h | g/h | g/h | kg/h | % by weight | ML$_{1+4}$ 100° C. |
| Example 16 | A | 2 | 0 | 5.5 | 1.0 | 1.4 | 28 | 85 |
| Example 17 | B | 2 | 0 | 3.3 | 0.6 | 0.9 | 27 | 80 |
| Example 18 | B | 1 | 0 | 5.5 | 1.0 | 0.7 | 24 | 28 |
| Example 19 | B | 0.5 | 0 | 3.0 | 0.4 | 0.9 | 27 | 75 |
| Example 20 | C | 1 | 0 | 3.3 | 0.6 | 0.9 | 27 | 82 |
| Example 21 | B2 | 1 | 0 | 3.3 | 0.6 | 0.9 | 27 | 85 |
| Example 22 | A | 1 | 0 | 2.75 | 0.5 | 0.7 | 26 | 85 |
| Example 23 | B | 2 | 400 | 5.5 | 1.0 | 0.7 | 27 | 90 |
| Comparative example 7 | Not added | | 0 | 2.75 | 0.5 | 0.9 | 27 | 85 |
| Comparative example 8 | Not added | | 0 | 5.5 | 1.0 | 0.8 | 24 | 35 |
| Comparative example 9 | *1 | | 0 | 5.5 | 1.0 | 0.7 | 26 | 40 |
| Comparative example 10 | *2 | | 0 | 5.5 | 1.0 | 0.9 | 27 | 85 |
| Comparative example 11 | *3 | | 0 | 5.5 | 1.0 | 0.8 | 24 | 35 |
| Comparative example 12 | Not added | | 400 | 5.5 | 1.0 | 0.7 | 26 | 85 |

| | Result of polymerization | | | |
|---|---|---|---|---|
| | Iodine value | Operating period Hours | Deposit ratio % Amount of Deposit Amount of Polymerized | Note |
| Example 16 | 0 | 54 | 6 | |
| Example 17 | 0 | 95 | 3 | |
| Example 18 | 0 | 240 | 6 | |
| Example 19 | 0 | 54 | 5 | |
| Example 20 | 0 | 48 | 3 | |
| Example 21 | 0 | 48 | 4 | |
| Example 22 | 0 | 48 | 5 | Mixing with catalyst |
| Example 23 | 15 | 54 | 2 | |
| Comparative example 7 | 0 | 30 | 60 | Clogging and Jamming |
| Comparative example 8 | 0 | 20 | 84 | Clogging and Jamming |
| Comparative example 9 | 0 | 24 | 40 | Clogging and Jamming |
| Comparative example 10 | 0 | 40 | 20 | Clogging and Jamming |
| Comparative example 11 | 0 | 20 | 35 | Clogging and Jamming |
| Comparative example 12 | 15 | 24 | 40 | Clogging and Jamming |

*1 Dioctyl sodium sulfosuccinate was supplied at 1 g/h.
*2 n-hexan was supplied at 600 g/h.
*3 STADIS 450 was supplied at 1 g/h.

INDUSTRIAL USABILITY OF THE INVENTION

By the preparation process of the present invention, fouling, which develops when a rubbery ethylene copolymer is prepared with the use of at least one kind of transition metal-based catalyst selected from the group consisting of V, Zr, and Hf-based catalysts, can be prevented without affecting either much of the polymerization activity, or the properties of the polymer that is produced, etc. and without the need to form a polysiloxane-coating film layer on the inner wall of a reactor. Accordingly, the present invention make possible the industrial preparation of a rubbery ethylene-based copolymer by the slurry polymerization process using at least one kind of transition metal-based catalyst selected from the group consisting of V, Zr, and Hf-based catalysts. Conventionally and substantially this polymerization process could not be conducted because of fouling. The producibility and the economics of the plant for its preparation have been greatly improved, since the formation of a polysiloxane-coating film layer is not necessary, and since the shutdown and the overhaul, and the cleaning of the reactor, are not substantially necessary.

We claim:

1. A process for preparing an ethylene-α-olefin copolymer comprising copolymerizing ethylene and an α-olefin, or the two with a non-conjugated diene, in a polymerization medium in which substantially no resulting copolymer is dissolved, in the presence of a catalyst in which at least one transition metal compound selected from V, Zr and Hf compounds and an organoaluminum compound are supported on a carrier with the coexistence of a polysiloxane compound in an amount effective to prevent adhesion of the resulting copolymer.

2. The process of claim 1, wherein the transition metal compound is a Zr compound.

3. The process of claim 2, wherein the Zr compound is a compound represented by the formula:

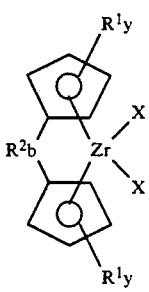

wherein each $R_1$ is independently a $C_1$-$C_{20}$ linear, branched, or cyclic alkyl group, or a $C_2$-$C_4$ cyclic alkylene group which forms a fused ring system group, $R^2$ is a $C_1$-$C_6$ linear, branched, or cyclic alkylene, a $Si_1$-$Si_2$ alkyl substituted silanylene group, or an alkyl substituted silaalkylene group, each X is independently an alkyl, aryl, halide, hydride, or oxygen bridge of a zirconocene dimer, "y" is the number 2, 3 or 4, and "b" is the number 0 or 1.

4. The process of claim 3, wherein the Zr compound is a compound selected from the group consisting of dimethylsiliconbis(tetrahydroindenyl) zirconium chloride, tetrahydroindenyl zirconium chloride, and indenyl zirconium chloride.

5. The process of claim 1, wherein the transition metal compound of V is vanadium oxytricholoride.

6. The process according to claim 1, wherein the organoaluminum compound is represented by the formula:

$$AlR^1R^2R^3$$

wherein $R^1$, $R^2$ and $R^3$, which are the same or different, are alkyl or alkoxyl groups having 1-14 carbon atoms, halogen or hydrogen, and at least one is alkyl.

7. The process of claim 1, wherein the organoaluminum compound is represented by the formula:

$$R^4R^5Al-O-AlR^6R^7$$

wherein $R^4$, $R^5$, $R^6$ and $R^7$, which are the same or different, are alkyl or alkoxyl groups having 1-14 carbon atoms.

8. The process of claim 1, wherein the organoaluminum compound is an alumoxane represented by the formula:

$$(R^8-Al-O)_n$$

wherein $R^8$ is an alkyl having 1-5 carbon atoms and n is an integer of 1-40.

9. The process of claim 1, wherein the organoaluminum compound is an alumoxane represented by the formula:

$$R^8(R^8-Al-O)_nAl(R^8)_2$$

wherein $R^8$ is an alkyl having 1-5 carbon atoms and n is an integer of 1-40.

10. The process of claim 1, wherein as the transition metal compound a Zr compound is used and as the organoaluminum compound an alumoxane represented by the general formula:

$$(R^8-Al-O)_n$$

wherein $R^8$ is an alkyl having 1 to 5 carbon atoms and n is an integer of 1-40, or $$R^8(R^8-Al-O)_nAl(R^8)_2$$

wherein $R^8$ is an alkyl having 1-5 carbon atoms and n is an integer of 1-40.

11. The process of claim 1, wherein the polysiloxane compound is a polyorganosiloxane compound having an average composition ratio of $$RaSiO_{\frac{4-a}{2}}$$

wherein R is a monovalent organic radical which is substituted or unsubstituted, and "a" is a number greater than 0 and less than 4.

12. The process of claim 11, wherein the "a" in $$RaSiO_{\frac{4-a}{2}}$$

is a number between 1.800-2.500.

13. The process of claim 11 or 12, wherein R in $$RaSiO_{\frac{4-a}{2}}$$

is a methyl-, ethyl-, propyl-, vinyl-, phenyl- or halogen-substituted hydrocarbon radical thereof.

14. The process of claim 1, wherein the degree of polymerization of the polysiloxane compound is between 3-10,000.

15. The process of claim 1, wherein the polysiloxane compound is used in the range of 0.1-5,000 ppm of the polymerization medium.

16. The process of claim 1, wherein the polymerization medium is a hydrocarbon having 3-5 carbon atoms.

* * * * *